(12) United States Patent
Gordon

(10) Patent No.: US 6,913,271 B2
(45) Date of Patent: Jul. 5, 2005

(54) PET BUGGY

(76) Inventor: Deborah M. Gordon, 1305 Main St., Genoa, OH (US) 43430

( * ) Notice: Subject to any disclaimer, the term of this patent is extended or adjusted under 35 U.S.C. 154(b) by 0 days.

(21) Appl. No.: 10/268,427

(22) Filed: Oct. 10, 2002

(65) Prior Publication Data

US 2003/0067130 A1 Apr. 10, 2003

Related U.S. Application Data

(60) Provisional application No. 60/328,161, filed on Oct. 10, 2001.

(51) Int. Cl.⁷ .......................... B62M 1/00; B62D 61/06; B62B 1/00; A01K 31/07; A47C 31/00
(52) U.S. Cl. ..................... 280/87.01; 280/62; 280/79.2; 280/47.17; 280/47.34; 119/453; 297/484
(58) Field of Search .................... 280/47.34, 47.35, 280/47.36, 47.371, 47.38, 47.39, 47.41, 639, 2, 62, 79.11, 79.2, 87.01, 87.021, 656; D24/185; D30/108, 109, 152, 153; D34/17, 19, 21, 23, 24, 25; 297/484; 119/453

(56) References Cited

U.S. PATENT DOCUMENTS

| | | | | |
|---|---|---|---|---|
| 758,123 A | * | 4/1904 | Weis .......................... | 297/484 |
| 3,275,337 A | * | 9/1966 | Lau ............................ | 280/87.1 |
| 4,236,723 A | * | 12/1980 | Lemmon .................... | 280/1.5 |
| 4,796,565 A | * | 1/1989 | Charbeneau ................ | 119/751 |
| 4,852,520 A | * | 8/1989 | Goetz ......................... | 119/497 |
| 4,977,857 A | * | 12/1990 | Slawinski ................... | 119/497 |
| 5,020,813 A | * | 6/1991 | Gottschalk ................. | 280/204 |
| 5,224,720 A | * | 7/1993 | Chaw et al. ................. | 280/62 |
| 5,243,931 A | * | 9/1993 | McDonough ............... | 119/671 |
| 5,538,267 A | * | 7/1996 | Pasin et al. ................ | 280/87.01 |
| 5,599,033 A | * | 2/1997 | Kolbus et al. .............. | 280/204 |
| 5,701,843 A | * | 12/1997 | Lazides ....................... | 119/496 |
| 5,957,482 A | * | 9/1999 | Shorter ....................... | 280/639 |
| 6,098,993 A | * | 8/2000 | Bellinson .................... | 280/1.5 |
| 6,196,572 B1 | * | 3/2001 | Durrin ........................ | 280/648 |
| 6,223,691 B1 | * | 5/2001 | Beattie ........................ | 119/453 |
| 6,230,656 B1 | * | 5/2001 | Walach ....................... | 119/496 |
| 6,260,566 B1 | * | 7/2001 | LaFave et al. ............ | 135/88.01 |
| 6,267,080 B1 | * | 7/2001 | Roy ............................ | 119/453 |
| 6,318,740 B1 | * | 11/2001 | Nappo ........................ | 280/87.01 |
| 6,374,775 B1 | * | 4/2002 | Baumsteiger ............... | 119/496 |
| 6,386,560 B2 | * | 5/2002 | Calender .................... | 280/47.34 |
| 6,523,499 B1 | * | 2/2003 | Chrisco et al. ............. | 119/496 |
| 6,584,937 B1 | * | 7/2003 | Ludolph ..................... | 119/453 |
| 6,607,200 B1 | * | 8/2003 | Bridges ...................... | 280/47.35 |
| 6,779,805 B1 | * | 8/2004 | Marcus ....................... | 280/79.11 |

* cited by examiner

Primary Examiner—Christopher P. Ellis
Assistant Examiner—G B Klebe
(74) Attorney, Agent, or Firm—Marshall & Melhorn, LLC

(57) ABSTRACT

A wheeled vehicle or buggy for transporting aged, infirm, or disabled pets is provided. The buggy can also be used when the pet owner wants to go further than the pet can travel on its own. The buggy has a platform portion on which the pet can lay, substantially surrounded by walls to contain the pet within the buggy. At least one door opening may be provided for pets who are able to enter and leave the buggy by themselves. A rotatable handle is provided which can be rotated from a cart pushing position to a cart pulling position. Stops are provided to prevent the handle from over traveling and falling to the ground.

19 Claims, 3 Drawing Sheets

PET BUGGY

RELATED APPLICATIONS

This application claims the benefit, under 35 U.S.C. §119(e) of provisional application Ser. No. 60/328,161, filed Oct. 10, 2001. The specification of said provisional application is specifically incorporated by reference.

BACKGROUND OF THE INVENTION

The present invention relates to a device for the transportation, of injured, disabled, or aged or infirm pets, or for distances further than the pet can feasibly travel. The present invention is also useful for veterinary use, office use, and use at pet shows and the like.

The fondness of people for pets is well known and almost legendary. One of the favorite past times of pet owners is to walk their dogs or other animals as a means of not only exercising themselves, but exercising their pets and keeping both healthy. However, a problem arises when their pets, such as a dog, a cat, or other domesticated or undomesticated animal is no longer able to take walks with their owner, or travel as far as owner wants to walk, jog, or bike.

Pets can become unable to walk with their owners either temporarily, semi-permanently, or permanently. An example of a temporary lapse in the ability to walk could be, for example, if a dog injures its legs, particularly its rear legs, and can no longer walk while the legs heal. A semi-permanent type of injury would be hip dysplasia or arthritis of the hip, particularly in dogs. When this type injury flares up it may prohibit the dog from walking. Further, at times the owner may want to walk, jog, or bike further than pet can feasibly travel so the owner could cart the pet.

A very common situation which occurs is when the pet becomes aged or infirm and simply is no longer able to walk with its owners while in its advancing years. An example of this could be a pet with congestive heart failure who can walk around a few steps in the home with its owner so it is able to sit by its owner, for example, in the evenings, but simply can no longer take long walks. Such a pet, while it may live for many years, simply becomes demoralized when no longer able to walk with its owners. Other types of injuries, such as an amputation, may permanently prevent a pet from walking.

Many pet owners attempt to solve the problem of transporting pets under such conditions by using the commonly known human baby buggy, and attempting to place the pet on the seat intended for the baby. However, the human baby buggy is simply not designed for transporting pets. Humans need to be transported more or less in a vertical position, i.e., the baby's hips will fit on a seat, while the torso, arms, and head of the baby are vertical, and the legs hang downwardly.

When it is attempted to place a pet on the baby buggy seat, it tends to fall through the leg openings. In addition there is not sufficient space for the pet to rest its hind quarters comfortably. Therefore, attempting to use a baby buggy for a pet is not a satisfactory solution to the problem in the art.

A children's cart or buggy which is available for hiking/jogging also will not work because the seat slopes backward with a drop down for the child's feet. This presents its own set of problems for the pet.

Another attempted solution is to strap a pair of wheels to a pet, for example, to a dog about its hind quarters if it is the rear legs of the dog that have become disabled, so that the pet can have mobility with its front legs, while the wheeled assembly supports the rear of the dog. However, these solutions have not been entirely satisfactory as they are unstable, and they are hard for the pet to use while going up and down steps or over curbs, etc. Therefore, those skilled in the art have continued to search for a better solution.

Therefore, one of the objects of the present invention is to provide a pet buggy for the transportation of injured, disabled, or aged and infirm pets.

Another object of the present invention is to provide a device for the transportation of injured, disabled, or aged and infirm pets which can be pushed or pulled by the pet's owner.

Another object of the present invention is to provide a pet buggy which will allow a pet to travel for as long as the owner wants to walk, bike, or jog even though the pet normally may not be able to go such a distance.

A still further object of the present invention is to provide a pet buggy of the foregoing nature which provides a flat surface on which a pet may lie while being transported.

Further objects and advantages of the present invention will be apparent from the specification and drawings of the present provisional application.

It is to be understood that the present invention is not limited to the details of construction and arrangement of parts illustrated in the accompanying drawings, since the invention is capable of other embodiments, and is capable of being practiced or carried out in various ways within the scope of the claims. Also, it is to be understood, that the phraseology and terminology employed herein is for the purpose of description, and not of limitation.

DESCRIPTION OF THE PREFERRED EMBODIMENT

Figure 1:
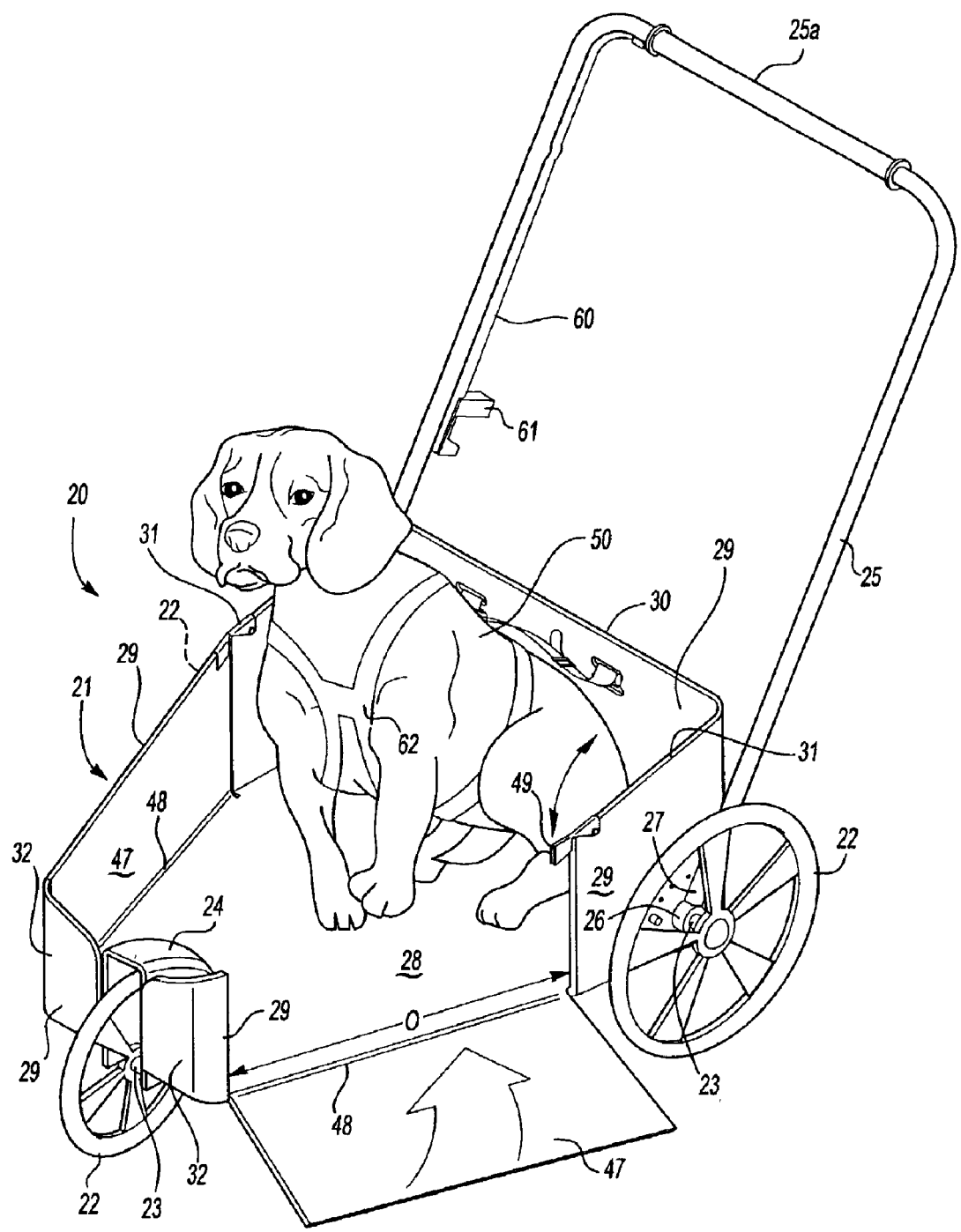
FIG. 1 is a perspective view of a construction embodying the present invention.

Referring to FIG. 1, a pet buggy embodying the construction of the present invention is generally indicated by the numeral 20. The pet buggy 20 has a body portion 21 supported by three or more wheels 22 which may be of varying sizes depending upon the particular application. The wheels 22 are supported for rotation by suitable axles 23 connected to, or carried by, the body portion 21. One or more fenders 24 are provided on the body portion 21 to prevent the pets and/or its owner from being splashed should the pet buggy go through water, mud or other undesirable conditions while the pet is being walked. In the embodiment shown in FIG. 1, only one fender 24 is shown, which prevents the pet 50, riding in the pet buggy 21, from being splashed. It is well within the skill of the art to provide fenders 24 on the other wheels 22 to prevent the pet owner from being splashed while pushing the pet buggy 20.

A handle 25 is rotatably attached to the pet buggy 20 for the convenience of the owner while pushing the pet buggy 20. In the preferred embodiment, the handle 25 is rotatable about the axle 23. Bearings 26 provided at the proximal ends 27 of the handle 25 permit rotation of the handle 25 about the axle 23. The handle 25 may be a fixed height or adjustable height for the convenience of the owner of the buggy Handle 25 has a cushioned portion 25A for the comfort of the pet owner. As will be explained herein below, the handle 25 may be adjusted to a predetermined desired position for pushing or towing the pet buggy.

The body portion 21 of the buggy is preferably of a one piece molded construction having a platform portion 28, which extends in a horizontal plane so that the injured, disabled, infirm, or extended traveling pet may sit or lie in the buggy in the same position that it would lie on a floor were it at home with its owner. The horizontal platform portion 28 is bounded by a plurality of upstanding side walls 29, such as rear wall 30, side walls 31, and front walls 32. The front fender 24 may be integrally formed with the front walls 32, if desired, or it may be formed separately. As explained hereinabove, fenders 24 may be provided on the rear of the buggy, and these may be integrally formed with the side walls 31.

Figure 2:
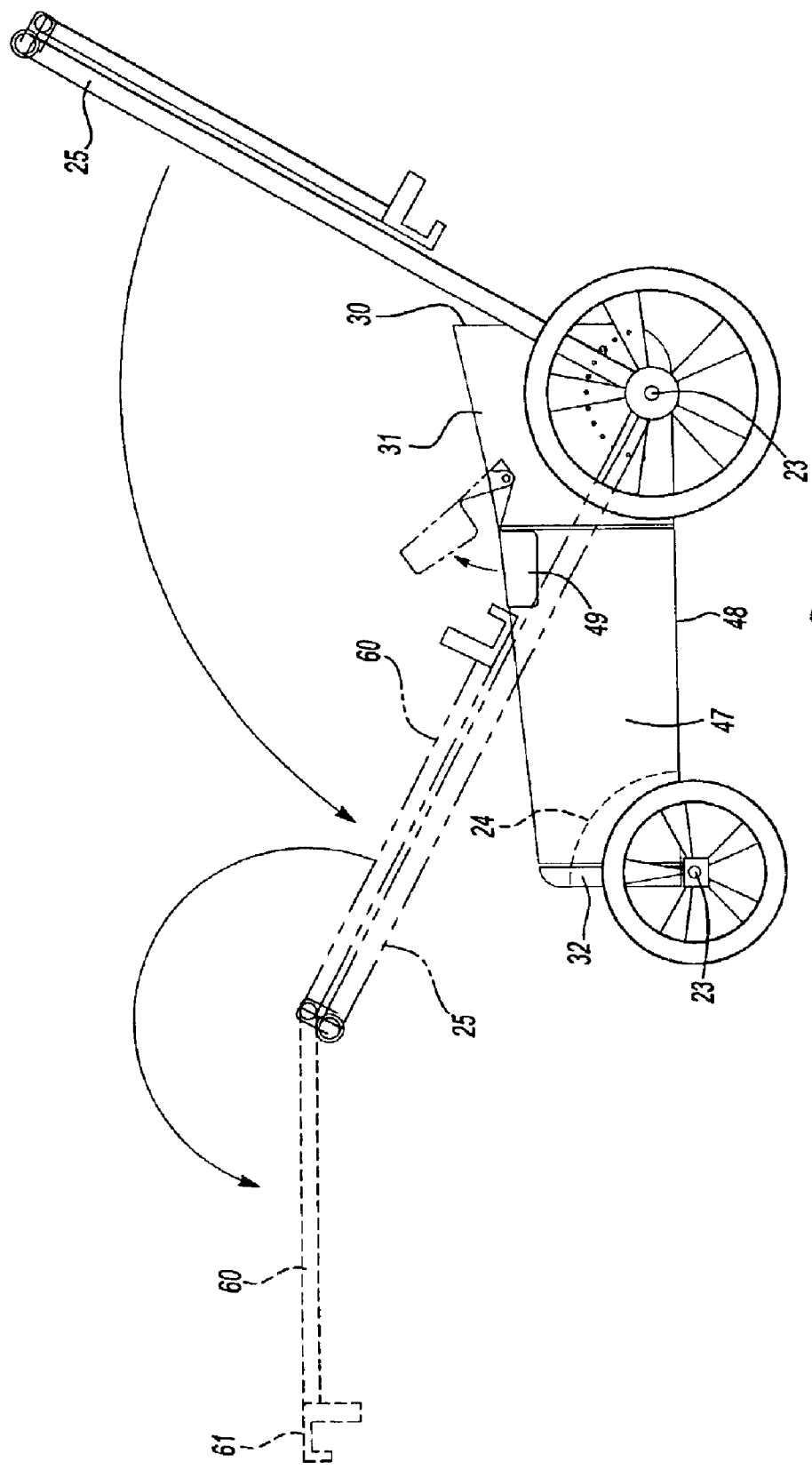
FIG. 2 is an elevational view of the construction shown in FIG. 1.
Figure 3:
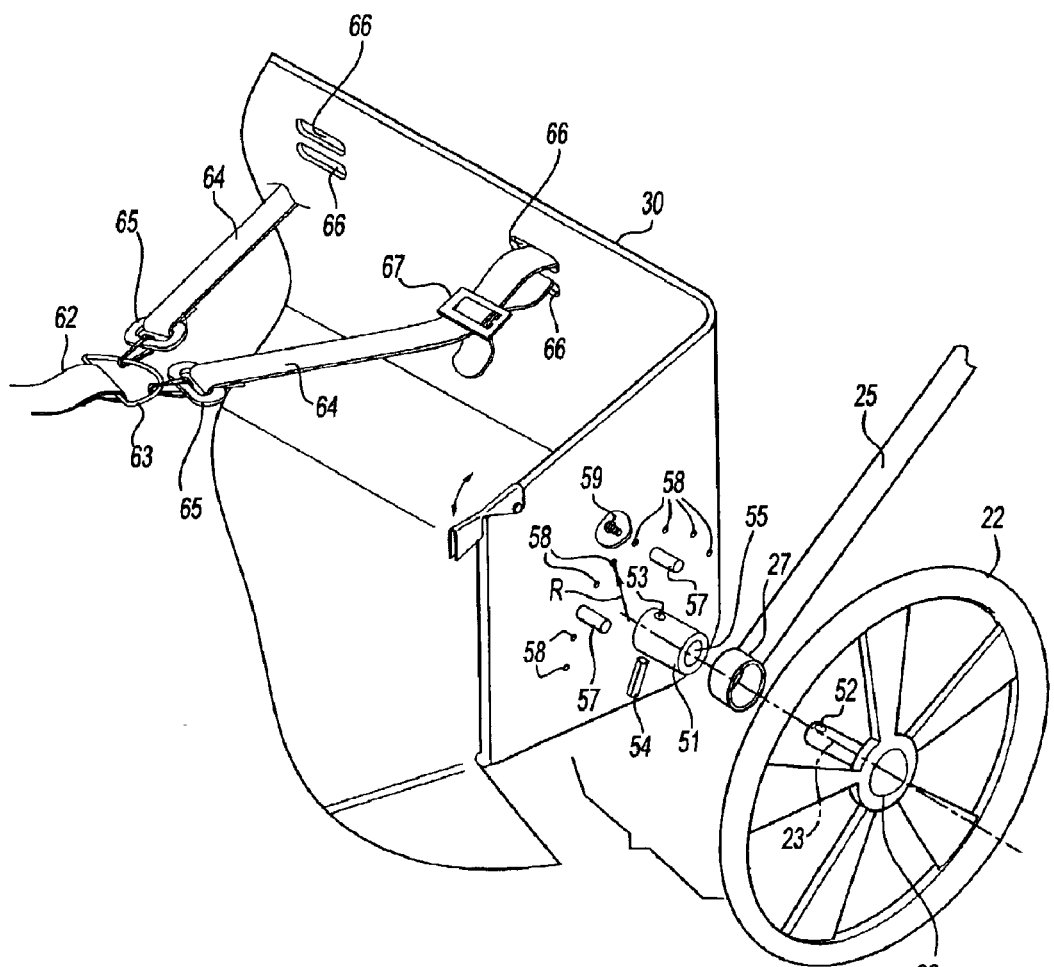
FIG. 3 is a perspective view, partially broken away, showing on an enlarged scale details of the rotatable handle and means for pet restraint.

The front of the body portion 21 may be narrower than the rear portion of the body 21 as illustrated in FIGS. 1–3, if desired. In such a case portions of the side walls 31 would converge inwardly, as shown at 31A. Also, the front wall 32 would be narrower than the rear wall 30.

A door or doors 47 may be provided in my pet buggy 20, if desired. The door or doors 47 would be useful in a situation where the aged or infirm pet was still sufficiently ambulatory to get in and out of the pet buggy itself. Preferably, the door or doors 47 would be provided to close an opening "O" provided in the upstanding walls 29 between the front walls 32 and the side walls 31. The door or doors 47 would be preferably formed integrally with the body portion 21 of the pet buggy, and would be connected thereto by a living hinge 48.

It is well within the skill of the art to which the invention pertains to provide other constructions for the pet buggy 20, such as a steel fabrication, or a fabrication out of another metal, in which case the sidewalls may welded or otherwise attached to the platform portion 28. Further, the door or doors 47 would then most likely be attached to the platform portion by a piano hinge instead of a living hinge. All of these constructions are well within the scope of the present invention.

Referring now to FIGS. 2 and 3 there are shown additional details of construction of my novel pet buggy. Axle 23, upon which wheel 22 is mounted, rotates within a bearing (not shown) carried by the wheel hub 22B. Since axle 23 rotates with respect to the wheel 22, and vice versa, it does not need to rotate with respect to the body portion 21 of the pet buggy, but instead may be fixedly attached thereto. This is accomplished by fastening a bearing 51 to each upstanding side wall 31 in a predetermined desired position, by sonic welding, welding, or any suitable method known in the art, depending on the material of the sidewall 31, and the construction of the pet buggy 20. Each bearing 31 will have an axial aperture 55 to accept axle 23, and a second diametrical aperture 53 to accept a pin 54 which will pass through first diametrical aperture 52 provided in axle 23 to prevent rotation of the axle 23 with respect to the body 21.

To assemble the handle and the wheels to the rear of the body portion 21 of the pet buggy 21, the journals 27A found at each end 27 of the handle 25 would be spread apart and slipped over the bearings 51. Next, the axles 23 of each wheel 22 would be inserted into axial apertures 55, and pins 54 inserted. Pins 54 should have a press or force fit to prevent their easy removal after assembly of the wheels 22 to the buggy 20 to provide for the safety of the pet and its owner.

Handle 25 may rotate from a position convenient for pushing the pet buggy 20, to a position used for towing the pet buggy, and be restrained from traveling further by adjustable stops 57 which are placed as desired by the pet owner in a plurality of diametrical spaced holes which are provided a radial distance from the center of the bearing 51. Each of the stops is held in place by a screw 59 which is passed through a desired hole 58 and received in screw threads (not shown) interiorly of the pin 57.

When the handle is placed forward in the towing position, a towing arm 60, which is rotatably attached to the handle 25, is swung forward and attached by way of the means for attachment 61 to the tow vehicle. The means for attachment may be in the for of a pin, a tongue, or other suitable device known in the art, depending on the tow vehicle being used.

It is preferred that the pet 50 being transported in the pet buggy 20 be restrained therein. The preferred method of accomplishing this is to have the pet 50 wear a commercially available pet harness 62. Such pet harnesses typically have a D-ring 63 mounted thereon to attach a leash to. In the present invention, a pair of straps 64 attach to the D-ring 63 to restrain the pet. Each strap 64 has at on end a typical connector 65 of the type found on a leash. The other end of each strap 64 will pass through a pair of slots 66 provided in the rear wall, and then into a buckle 67 provided on the strap 64, to provide for adjustability of the length of the strap, depending on the application. It is contemplated, for example, that the straps 64 will need to be longer for cats than dogs, and will need to be longer for small dogs than for large dogs.

Thus, by carefully studying the problems of transporting pets, a novel pet buggy has been provided.

I claim:

1. A pet buggy comprising:
   a body portion, said body portion comprising;
      a platform portion;
      a plurality of upstanding walls substantially surrounding said platform portion to contain a pet therein; and
      a plurality of wheels attached to said pet buggy to provide for the movement thereof, said plurality of wheels including a single front wheel rotatably mounted to a single front axle, and a pair of rear wheels rotatably mounted to at least one rear axle;
   a handle directly attached to said at least one rear axle or to a bearing carrying said at least one rear axle, and rotatable between a pushing position and a towing position; and
   a pair of straps adjustably attached to said body portion to attach to a D-ring on an animal harness.

2. The vehicle defined in claim 1, and further comprising:
   said handle rotatably attached to said body portion and rotatable between a pushing position and a towing position is rotatable about a rear axle of the pet buggy.

3. The vehicle defined in claim 2, and further comprising:
   each one of said pair of straps adjustably attached, at one end thereof to a wall of said body portion, and having at its other end a connector to attach to a D-ring on an animal harness.

4. The vehicle defined in claim 3, and further comprising:
   the body portion being of a one piece molded construction.

5. The vehicle defined in claim 4, and further comprising:
   the body portion having a front portion and a rear portion, the front portion being narrower that the rear portion.

6. The vehicle defined in claim 5, and further comprising:
   a fender provided over the front wheel to prevent splashing.

7. The vehicle defined in claim 6, wherein the platform portion is substantially horizontal.

8. The vehicle defined in claim 5, wherein the handle is of adjustable height.

9. The vehicle defined in claim 8, wherein a cushioned portion is provided on the handle.

10. The vehicle defined in claim 5, wherein a towing arm is rotatably attached to the handle.

11. The vehicle defined in claim 4, further comprising:
   a door opening being provided in the body portion to accept a door when the door is in a closed position; and
   a door mounted to the platform portion and connected thereto by a living hinge, the door being rotatable between a closed position substantially closing the door opening, and an open position.

12. The vehicle defined in claim 11, and further comprising:
   the body portion having a front portion and a rear portion, the front portion being narrower that the rear portion.

13. The vehicle defined in claim 12, and further comprising:
   a fender provided over the front wheel to prevent splashing and molded integrally with the body portion.

14. The vehicle defined in claim 13, wherein the platform portion is substantially horizontal.

15. The vehicle defined in claim 14, wherein the handle is of adjustable height.

16. The vehicle defined in claim 15, wherein a cushioned portion is provided on the handle.

17. The vehicle defined in claim 16, wherein a towing arm is rotatably attached to the handle.

18. A pet buggy comprising:
   a body portion, said body portion comprising;
   a platform portion,
      a plurality of upstanding walls substantially surrounding said platform portion to contain a pet therein, except for at least one door opening;
   a door fixedly attached to said platform portion and closeable to close said door opening when desired; and
   a plurality of wheels attached to said pet buggy to provide for the movement thereof;
   a handle directly attached to a horizontally disposed rear axle of said pet buggy or bearing carrying the horizontally disposed rear axle and rotatable between a pushing position and a towing position; and
   a pair of separate and distinct straps, each of said pair of straps adjustably attached to said body portion and individually attachable to a D-ring on an animal harness.

19. A pet buggy comprising:
   a body portion, said body portion comprising:
      a platform portion;
      a plurality of upstanding walls substantially surrounding said platform portion to contain a pet therein, except for at least one door opening;
      a door fixedly attached to said platform portion and closeable to close said door opening when desired;
      a plurality of wheel carrying axles mounted to said body portion of said pet buggy; and
      a plurality of wheels attached to said plurality of wheel carrying axles to provide for the movement of the pet buggy;
   a handle directly attached to about at least one of said plurality of axles; and rotatable between a pushing position and a towing position; and
   a pair of straps, each one of said pair of straps adjustably attached, at one end thereof to a wall of said body portion, and having at its other end a connector to attach to a D-ring on an animal harness.

* * * * *